United States Patent [19]

Bernier et al.

[11] Patent Number: 4,871,131
[45] Date of Patent: Oct. 3, 1989

[54] EJECTION SEAT HAULBACK SYSTEM

[75] Inventors: Coral A. Bernier, Des Moines; Douglas E. Swanson, Bellevue, both of Wash.

[73] Assignee: The Boeing Company, Seattle, Wash.

[21] Appl. No.: 246,413

[22] Filed: Sep. 19, 1988

[51] Int. Cl.$^4$ .............................................. B64D 25/06
[52] U.S. Cl. ............................ 244/122 AG; 180/268; 280/806; 242/75.51; 242/55
[58] Field of Search ............ 244/121, 122 AG, 122 B, 244/122 A, 122 R; 280/806; 180/268; 242/55, 75.51; 297/478, 480, 477, 479

[56] References Cited

U.S. PATENT DOCUMENTS

| | | |
|---|---|---|
| 2,892,602 | 6/1959 | Servanty . |
| 3,077,324 | 2/1963 | Strickland, Jr. . |
| 3,178,136 | 4/1965 | Bayer .............................. 244/122 AG |
| 3,219,297 | 11/1965 | Kenyen ............................. 244/122 B |
| 3,389,873 | 6/1968 | Filippi et al. . |
| 3,488,090 | 1/1970 | Douglas ........................ 244/122 AG |
| 3,522,918 | 8/1970 | Wrighton . |
| 3,910,521 | 10/1975 | O'Callaghan .................... 242/75.51 |
| 3,918,545 | 11/1975 | Andres et al. . |
| 3,984,127 | 10/1976 | Bendler et al. . |
| 4,437,628 | 3/1984 | Schwartz . |
| 4,511,097 | 4/1985 | Tsuge et al. ........................ 120/268 |
| 4,534,441 | 8/1985 | Kamijo et al. ...................... 280/806 |
| 4,655,312 | 4/1987 | Fanton ................................ 180/268 |
| 4,667,904 | 5/1987 | Herndon . |
| 4,678,134 | 7/1987 | Ameur ................................ 280/806 |

Primary Examiner—Galen L. Barefoot
Attorney, Agent, or Firm—Seed and Berry

[57] ABSTRACT

A system for retracting a pilot into an ejection seat during either normal flight or an emergency ejection procedure. A pair of haulback straps are wound on a haulback reel that is rotatably driven by a gas-powered motor. The motor receives pressurized gas from the aircraft's bleed air during normal flight and from a pyrotechnic cool gas generator during an ejection. The rate of gas flow to the motor is controlled by a servovalve. The actual rotational velocity of the haulback reel is measured by a tachometer and compared to a desired haulback velocity profile. A control signal that is proportional to the difference between the actual haulback velocity and the desired haulback velocity is applied to the servovalve so that the desired haulback velocity is achieved. The desired haulback velocity may vary as a function of time from the start of an ejection procedure. The system also includes an acceleration sensor for actuating a haulback reel locking mechanism when excessive g-loads are sensed, a reel lock actuated if the haulback straps unwind from the haulback reel at an excessive rate, and a spring-loaded winding mechanism to apply a relatively small winding torque to the haulback reel to prevent any slack from developing in the haulback straps.

18 Claims, 2 Drawing Sheets

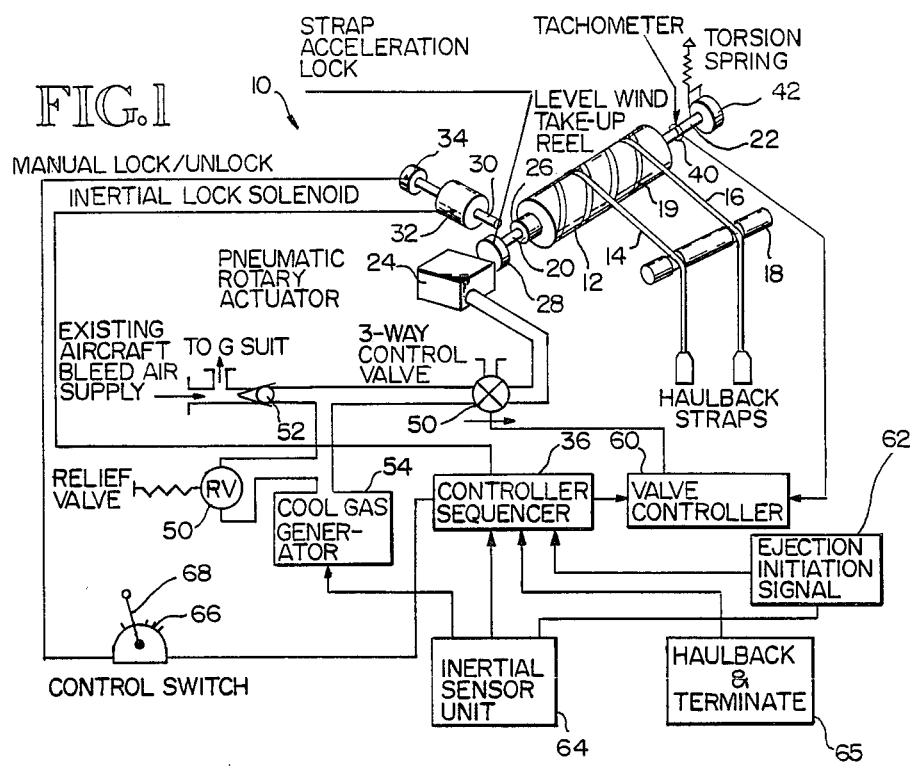
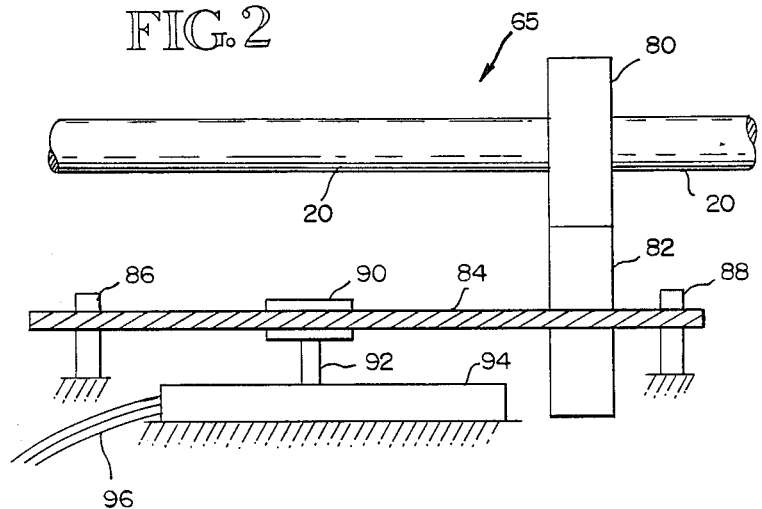

EJECTION SEAT HAULBACK SYSTEM

STATEMENT OF GOVERNMENT RIGHTS

This invention was made with Government support under Contract No. F33615-84-C-0518. The Government has rights in this invention.

FIELD OF THE INVENTION

This invention relates to ejection seats for fighter aircraft, and more particularly, to a system for positioning and restraining a pilot in the seat during ejection but allowing the pilot to move freely prior to ejection.

BACKGROUND ART

Fighter aircraft are normally equipped with ejection seats that allow the pilot and any additional crew to safely escape the aircraft in the event the aircraft is disabled either through mechanical malfunction or hostile action. These ejection seats are typically propelled from the aircraft at very high velocities by rocket boosters so that the seat and pilot can eject quickly and then clear the tail of the aircraft. The high velocity required for successful ejection requires that the seat and pilot undergo a great deal of acceleration. Also, once the seat and pilot have been ejected, the airflow around the pilot subjects the pilot to rapid deceleration and aerodynamic buffeting. These accelerations, decelerations and aerodynamic buffeting can severely injure the pilot unless the pilot is properly positioned and securely restrained in the seat during ejection.

The pilot obviously could be restrained in the ejection seat by fixed straps securing the pilot to the ejection seat. However, it is necessary for the pilot to be able to move freely in the ejection seat at various times while flying the aircraft. For example, the pilot must check the six o'clock position often during some fight maneuvers to be sure that hostile aircraft are not on the aircraft's tail. In order to check the six o'clock position, the pilot must rotate his or her torso away from the back of the seat. However, it is not possible to perform this maneuver if the pilot is tightly restrained in the seat. It is therefore necessary to allow the pilot to move freely in the ejection seat during flight but be quickly positioned and restrained prior to and during ejection.

One prior art system for positioning and restraining a pilot in a seat prior to ejection yet allowing freedom of movement at other times is a powered reel system. Powered reel systems utilize restraining straps that either surround the pilot's torso or are connected to a harness surrounding the pilot. The restraining straps extend to and are wound on respective spring-loaded reels that maintain a relatively slight tension on the straps but otherwise allow the straps to be freely extended from the reels. The reels may or may not have an inertia locking system that locks the reels in the event that the respective straps unwind from the reel at an excessive rate. In either case, the reels are connected to a rotational drive mechanism that is energized just prior to ejection to rotate the reels and retract the restraining straps to pull the pilot back into the ejection seat. These "haulback" systems, as they are commonly called, typically utilize a gas-powered motor as the rotational drive mechanism and a pyrotechnic gas generator to supply pressurized gas to the motor.

Conventional gas-powered haulback systems suffer from two primary limitations. First, they are sometimes incapable of generating sufficient force and/or retracting the straps with sufficient speed to adequately position and restrain the pilot prior to ejection. As a result, the pilot can be severely injured or even killed. Second, the conventional gas-powered haulback systems sometimes generate excessive haulback forces. These excessive haulback forces can cause the pilot's torso to be accelerated to excessive velocities so that the pilot strikes the back of the ejection seat with excessive force, thereby injuring the pilot. As a result, these excessive haulback forces can also seriously injure the pilot.

DISCLOSURE OF THE INVENTION

It is an object of the invention to provide an ejection seat haulback system that generates sufficient haulback forces to position and restrain the pilot in the event of ejection yet allows the pilot to move freely prior to ejection.

It is another object of the invention to provide an ejection seat haulback system that generates a haulback force that is proportional to the acceleration-induced force resisting haulback.

It is another object of the invention to provide an ejection seat haulback system that positions and restrains the pilot in the event of ejection yet does not impart excessive forces or accelerations to the pilot during haulback.

It is another object of the invention to provide an ejection seat haulback system that is easily compatible with conventional inertia reel locking mechanisms, aircraft acceleration reel locking systems, and manual haulback systems.

It is a further object of the invention to provide an ejection seat haulback system that is relatively compact and light in weight.

These and other objects of the invention are provided by an ejection seat haulback system having a rotatably mounted haulback reel on which at least one haulback strap is wound. A pneumatic actuator is coupled to the haulback reel so that pressurized fluid applied to the actuator rotates the reel in a direction that winds the haulback strap on the reel. The pneumatic actuator is driven by a source of pressurized fluid through an electrically operated servovalve so that the servovalve controls the haulback force exerted by the haulback reel. The rotational velocity of the haulback reel is measured by a tachometer to generate a velocity signal that is transmitted to a valve controller. Upon receipt of an initiation signal, the valve controller transmits a control signal to the servovalve to cause the haulback reel to rotate at a predetermined rate regardless of the magnitude of the haulback force. The source of pressurized fluid is preferably bleed air from a jet engine powering the aircraft in normal flight and a pyrotechnic cool gas generator during an emergency ejection. The control signal generated by the valve controller is preferably proportional to the difference between the haulback reel rotational velocity as indicated by the tachometer signal and a predetermined rotational velocity. The predetermined rotational velocity may vary as a function of time from the initiation of an ejection sequence. This allows either complete haulback in a predetermined time duration or a predetermined haulback speed within a predetermined time duration independent of the length of haulback. The haulback system preferably also includes means for sensing when haulback has been completed and for generating a haulback terminate signal indicative thereof. The haulback terminate signal causes the servovalve to terminate the flow of fluid to the pneumatic actuator. The system may also include means for measuring the flight acceleration of the aircraft and locking means for preventing the haulback straps from unwinding on the haulback reel in response to a g-load signal indicative of an aircraft acceleration exceeding a predetermined value.

BRIEF DESCRIPTION OF THE DRAWINGS

FIG. 1 is a block diagram of one embodiment of the ejection seat haulback system of the present invention.

FIG. 2 is a schematic of a device for sensing the position of the haulback straps to terminate the haulback process when the pilot's back contacts the back of the ejection seat.

BEST MODE FOR CARRYING OUT THE INVENTION

Figures 3, 4:
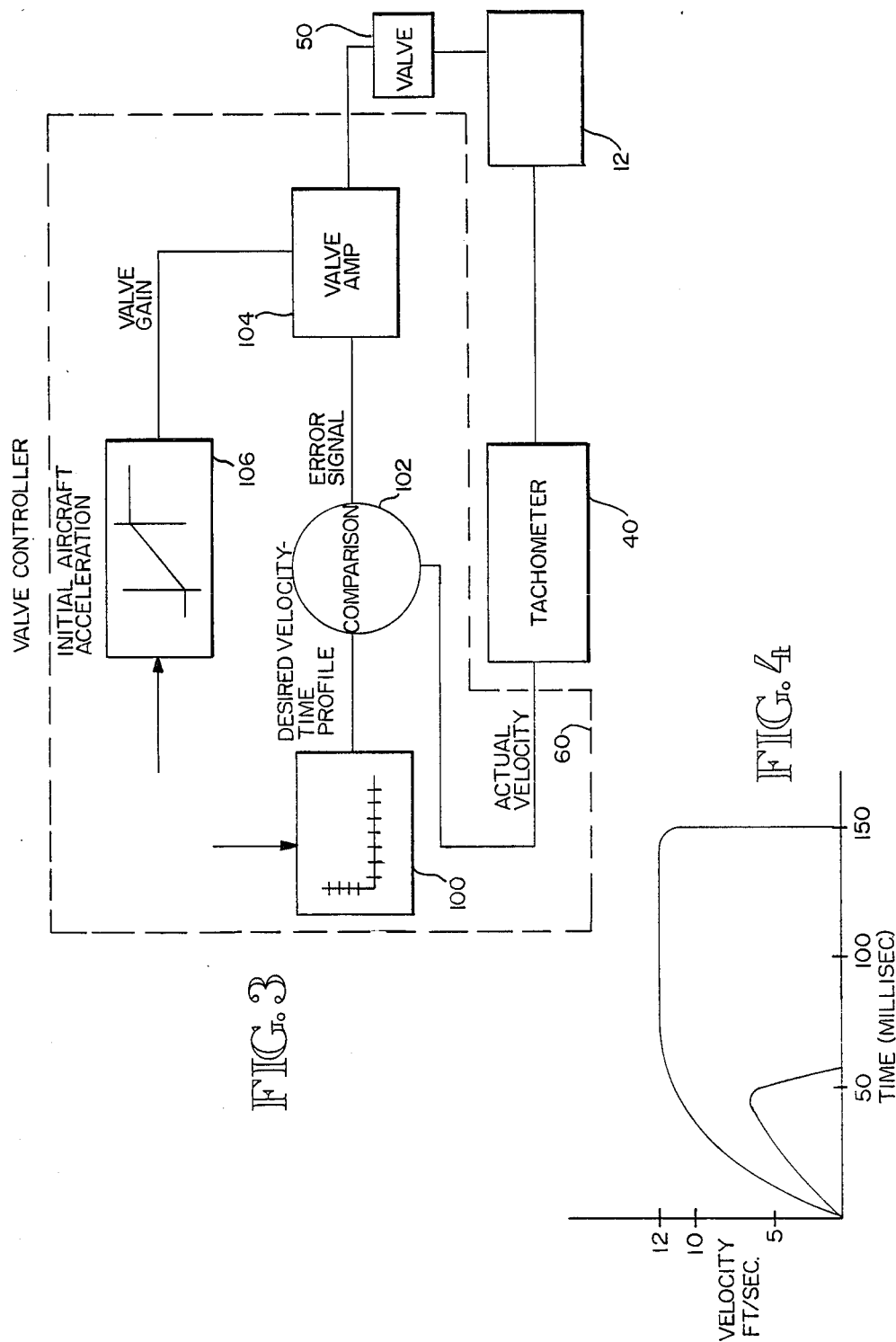
FIG. 3 is a block diagram of a valve controller used in the ejection seat haulback system embodiment of FIG. 1.
FIG. 4 is a graph of the haulback velocity as a function of time achieved by the embodiment of the ejection seat haulback system shown in FIG. 1.

One embodiment of the inventive ejection seat haulback system 10 is illustrated in FIG. 1. The system 10 includes a haulback reel 12 having a pair of haulback cables or straps 14, 16 wound thereon. The haulback cables or straps 14, 16 extend across a guide roller 18 and are connected to a pilot harness (not shown) of conventional design. Although the embodiment illustrated in FIG. 1 uses cables wound on the reel 12 that join straps before being connected to the pilot's harness, it will be understood that only a pair of cables or a pair of straps could be used. The term "straps 14, 16" is thus intended to refer to straps, cables, and similar components.

The reel includes spiral grooves 19 in which the straps 14, 16 are retained as they are wound on the reel 12 so that the haulback straps 14, 16 do not stack up on each other as they are wound onto the reel 12. As a result, the haulback force and velocity are the same for a given torque and rotational velocity of the reel 12, respectively, regardless of the quantity of haulback strap 14, 16 wound onto the reel 12. Although it is desirable for the straps 14, 16 to wind onto the reel 12 in a level manner, permissible since it merely alters the dynamics of the system. Thus, the spiral grooves 19 are not absolutely necessary.

The haulback reel 12 is fixedly mounted on a pair of axles 20, 22 so that the reel 12 and axles 20, 22 rotate together as a unit. The reel 12 is driven through axle 20 by a conventional pneumatic rotary actuator, such as a geared, high-speed, gas-driven motor 24. A ratchet 26 and a conventional acceleration lock 28 are also mounted on the axle 20. The acceleration lock 28 is of the type commonly used for automobile shoulder belts; it prevents further rotation of the reel 12 when the haulback straps 14, 16 unwind from the reel 12 at a rate exceeding a predetermined value. The ratchet 26 is engaged by a plunger 30 extending through a solenoid 32 and terminating in an actuating knob 34. The plunger 30 is actuated either manually by pushing the actuating knob 34 or electrically by energizing a solenoid 32 to cause the plunger 30 to engage the ratchet 26 to prevent further rotation of the reel 12. The plunger 30 is preferably spring-biased away from the ratchet 26 so that, in the event of a power failure, the reel 12 will be free to rotate. As explained below, the solenoid 32 is energized by a controller/sequencer 36.

The other axle 22 has mounted thereon a conventional tachometer 40 and a conventional torsion spring 42. The torsion spring 42 is also of the type commonly used with automobile shoulder belts; it exerts a relatively small, constant torque on the reel 12 to prevent slack from developing in the haulback straps 14, 16. The tachometer 40 generates a signal indicative of the rotational velocity of the reel 12. As explained in greater detail below, the tachometer 40 is used to control the haulback characteristics of the system 10 to provide adequate, but never excessive, haulback forces and velocities. Although the embodiment of FIG. 1 uses a tachometer 40 to measure the haulback velocity, it will be understood that other devices may be used. Also, the haulback velocity can be measured by measuring the linear velocity of the haulback straps, and velocity can be determined by measuring haulback velocity or position and integrating or differentiating, respectively.

The flow of pressurized fluid to the gas-driven motor 24 is controlled by a fast-acting, three-way servo-valve 50. As explained in greater detail below, in the normal flying mode, the servovalve 50 receives pressurized air from a conventional bleed air supply (not shown) provided by the aircraft's jet engines through a one-way valve 52. In the event of an emergency ejection, the servo-valve 50 receives pressurized gas from a conventional cool gas generator 54. The one-way valve 52 prevents the pressurized gas generated by the cool gas generator 54 from being applied to other devices, such as the pilot's G suit, that normally receive bleed air. A conventional relief valve 56 limits the maximum pressure that the cool gas generator 54 supplies to the servo-valve 50 for safety reasons.

The servovalve 50 is operated by a valve controller 60, explained in greater detail below with reference to FIG. 3. The valve controller 60 is, in turn, operated by the controller/sequencer 36 and the tachometer signal from the tachometer 40. The controller/sequencer 36 applies a haulback initiate signal to the valve controller 60. The valve controller then generates a control signal indicative of the desired rotational velocity of the haulback reel 12 at any instant of time. A comparator in the valve controller 60 compares the desired haulback reel 12 velocity, as indicated by the control signal, to the actual haulback reel 12 rotational velocity, as indicated by the tachometer signal from the tachometer 40. An error signal resulting from this comparison is then amplified to produce a valve control signal. The valve controller 60 then applies this control signal to the servo-valve 50.

The controller/sequencer 36 processes information delivered by a conventional ejection initiation signaling device 62, a conventional inertial sensor unit 64, a haulback terminate sensor 65, and a control switch 66. The control switch 66 is manually actuated through a lever 68 to determine the operating mode of the system. When the lever 68 is actuated to the INERTIAL position, the control switch 66 causes the controller/sequencer to actuate the solenoid 32 whenever the deceleration of the aircraft in any axis, as measured by the inertial sensor unit 64, exceeds a predetermined value. When the solenoid 32 locks the haulback reel 12 through the ratchet 26, the inclined periphery of the ratchet 26 can force the plunger 30 away from the ratchet 26 to allow continued rotation of the reel 12 in a direction that winds the haulback straps 14, 16 onto the reel 12. Thus, if the pilot leans back to create slack in the haulback straps 14, 16, the torsion spring 42 will rotate the reel 12 to wind the haulback straps 14, 16 onto the reel 12. The plunger 30 and ratchet 26 will then lock the reel 12 in the new position. When the inertial sensor unit 64 determines that the deceleration of the aircraft has fallen below a predetermined value, it applies a signal to the controller/sequencer, which, in turn, deenergizes the solenoid to allow the reel 12 to once again freely rotate. The reel 12 will, of course, become locked by the acceleration lock 28 anytime the haulback straps 14, 16 unwind from the reel 12 at a rate exceeding a predetermined value, regardless of the operating mode.

When the control switch 66 is in its LOCK position, it causes the controller/sequencer 36 to immediately energize the solenoid 32 so that the plunger 30 engages the ratchet 26. As in the INERTIAL mode, if the pilot leans back to create slack in the haulback straps 14, 16, the torsion spring 42 will rotate the reel 12 to wind the haulback straps 14, 16 onto the reel 12. The reel 12 may be manually unlocked by actuating the lever 68 to another position.

When the control switch 66 is in its RETRACT position, it causes the controller/sequencer 36 to apply a signal to the valve controller 60 so that the valve controller 60 energizes the servovalve 50, thereby applying bleed air to the gas-driven motor 24. The motor 24 then rotates the haulback reel 12 to wind the haulback straps 14, 16 onto the reel 12. The rotational velocity of the reel 12 is measured by the tachometer 40 and compared by the valve controller 60 to a desired rotational velocity. The valve controller 60 then adjusts the flow of bleed air through the servovalve 50 so that the reel 12 rotates at the desired speed. Winding of the haulback straps 14, 16 on the reel 12 continues until the haulback terminate sensor 65 generates an output when the haulback is completed. The haulback straps 14, 16 remain in the retracted position until another operating mode is selected with the lever 68.

Finally, when the switch 66 is in the AUTO mode, it directs the controller/sequencer 36 to signal to the valve controller to retract the haulback straps 14, 16 whenever the acceleration in any direction, as measured by the inertial sensor unit 64, exceeds a predetermined value. More specifically, when the inertial sensor unit 64 detects an excessive acceleration, it outputs a signal to the controller/sequencer 36, which, in turn, outputs a haulback initiate signal to the valve controller 60. The valve controller 60 then generates a desired haulback rate command which is compared to the tachometer signal from the tachometer 40 to generate a control signal that is proportional to the difference therebetween. The control signal from the valve controller 60 then adjusts the servovalve 50 to regulate the supply of bleed air to the gas-driven motor 24 so that the desired rate of haulback is achieved. As in the RETRACT mode, winding of the haulback straps 14, 16 on the reel 12 continues until the haulback terminate sensor 65 generates an output indicative that the haulback is complete. The haulback straps 14, 16 remain in the retracted position until another operating mode is selected with the lever 68.

An emergency ejection haulback can be initiated at any time, regardless of the operating mode selected through the lever 68. When the pilot manually actuates a conventional ejection handle (not shown) on the ejection seat, it causes the ejection initiation signal device 62 to output an ejection signal. The ejection initiation signaling device 62 may be, for example, merely a relay or switch that is actuated by the conventional ejection seat ejection handle. The ejection signal from the signaling device 62 is applied to the controller/sequencer 36, which, in turn, outputs a haulback initiate signal to the valve controller 60. The valve controller 60 then generates a haulback command that is indicative of the desired haulback velocity. As explained in greater detail below, the haulback command may be constant or it may vary as a function of either time or the rotational position of the haulback reel 12. The valve controller 60 outputs a control signal to the control valve 50 that is proportional to the difference between the desired rotational velocity (as indicated by the haulback command) and the actual rotational velocity (as indicated by the tachometer signal from the tachometer 40). The control valve 50 then adjusts the rate of gas flow from the cool gas generator 54 so that the desired rate of haulback is achieved. Haulback continues until the haulback terminate sensor 65 outputs a terminate signal to the controller/sequencer 36 indicative of the haulback completion.

One embodiment of a haulback position sensor 65 used in the haulback system of FIG. 1 is illustrated in FIG. 2. The haulback position sensor 65 includes a gear 80 fixedly mounted on the drive shaft 20 for the haulback reel 12 so that the gear 80 and shaft 20 rotate together. The gear 80 drives a second gear 82 that is fixedly mounted on a threaded follower shaft 84 so that the gear 82 and shaft 84 rotate together. The follower shaft 84 is rotatably mounted between a pair of sleeve bearings 86, 88. As a result, the follower shaft 84 rotates with the haulback reel 12. A follower 90 is threaded onto the follower shaft 84, and it is mounted on a wiper-actuating lever 92 of a conventional linear potentiometer 94. As the haulback reel 12 rotates, the follower 90 moves linearly along the follower shaft 84, thereby moving the actuating lever 92 along the potentiometer 94. The position of the actuating lever 92 is thus indicative of the position of the haulback reel 12. As is well understood in the art, the potentiometer 94 can be connected in a circuit (not shown) so that the voltage generated across electrical leads 96 is proportional to the position of the actuating lever 92. The voltage across the leads 96 is thus proportional to the rotational position of the haulback reel 12, and a predetermined voltage can be selected to indicate that the haulback straps 14, 16 have been fully retracted.

A block diagram of the valve controller 60 used in the haulback system of FIG. 1 is illustrated in FIG. 3. The valve controller 60 includes a desired haulback command generator 100 which may be implemented by conventional means to generate a haulback command schedule upon receipt of the haulback initiate signal from the controller/sequencer 36. The haulback command generator may be, for example, a microprocessor connected to a digital-to-analog converter. The microprocessor can be easily programmed by one skilled in the art to generate an appropriate command signal schedule.

Two examples of appropriate command signal schedules are is illustrated in FIG. 4. Haulback command signal profiles are illustrated in FIG. 4 for haulback distances of 2 inches and 14 inches. The schedule for a 14-inch haulback distance causes the haulback velocity to rapidly increase to a relatively high terminal haulback velocity. Furthermore, because of the relatively large haulback distance, the time duration of the haulback is also relatively large. In contrast, a 2-inch haulback distance allows for a more gradual increase in haulback velocity and still allows haulback to be completed within a relatively short period of time. Although two haulback signal profiles are illustrated in FIG. 4, it will be understood that other haulback signal profiles can be used. These other haulback signal profiles, as well as the haulback signal profiles illustrated in FIG. 4, can be implemented easily by one skilled in the art with a microprocessor and digital-to-analog converter, as explained above.

Returning now to FIG. 3, the haulback command signal from the desired haulback command generator 100 is applied to a conventional comparator 102 along with the tachometer signal from the tachometer 40. The comparator 102 generates an error signal that is proportional to the difference between the magnitude of the desired haulback command signal and the tachometer signal. The error signal is then applied to a conventional high gain amplifier 104 to produce the valve control signal that is applied to the three-way servovalve 50.

It is desirable for the response time of the haulback system to be faster when it must function under higher aircraft acceleration loads. Accordingly, the gain of the amplifier 104 is adjusted by a signal from a gain controller 106. The gain controller 106 can, once again, be implemented easily by one skilled in the art to sense the aircraft acceleration loads (i.e., g-forces) and generate a signal that is linearly proportional thereto up to a predetermined g-load (e.g., 3.5 g's). As a result, the haulback system force increases for higher aircraft acceleration loads so that complete haulback can be achieved within acceptable time limits, regardless of the aircraft acceleration loads.

The ejection seat haulback system thus achieves rapid haulback under all flight conditions without imposing excessive forces on the pilot. In addition to providing complete haulback in an emergency ejection procedure, it may also be used to provide haulback under normal flight conditions in a variety of operating modes. Finally, the haulback system may be integrated into a conventional ejection seat and it may include a variety of other restraint devices, such as acceleration reel locks and manual locking mechanisms.

We claim:
1. An ejection seat haulback system, comprising:
a rotatably mounted haulback reel having at least one haulback strap wound thereon;
a pneumatic actuator coupled to said haulback reel so that pressurized fluid applied to said actuator rotates said reel in a direction that winds said haulback strap on said reel;
haulback velocity measurement means for generating a velocity signal having a characteristic indicative of the velocity of said haulback reel;
a source of pressurized fluid;
an electrically operated pneumatic servovalve connected between said source of pressurized fluid and said pneumatic actuator to control the haulback force exerted by said haulback reel; and
valve controller means receiving the velocity signal from said velocity measurement means and, upon receipt of an initiation signal, applying a control signal to said servovalve to rotate said haulback reel at a predetermined rate regardless of the torque that said pneumatic actuator must apply to said haulback reel to achieve said predetermined rate.

2. The ejection seat haulback system of claim 1 wherein said haulback velocity measurement means is a tachometer coupled to said haulback reel so that said tachometer and haulback reel rotate with each other.

3. The ejection seat haulback system of clam 1 wherein said fluid is a pressurized gas and wherein said pneumatic actuator is a gas-driven motor.

4. The ejection seat haulback system of claim 3 wherein said system is installed in a jet-powered aircraft and said source of pressurized fluid is the bleed air from a jet engine powering said aircraft.

5. The ejection seat haulback system of claim 3 wherein said source of pressurized fluid is a pyrotechnic cool gas generator.

6. The ejection seat haulback system of claim 3 wherein said system is installed in a jet-powered aircraft and said source of pressurized fluid is the bleed air from a jet engine powering said aircraft during normal flight and a pyrotechnic cool gas generator during ejection from said aircraft.

7. The ejection seat haulback system of claim 1 wherein said servovalve controls the flow of said fluid to said pneumatic actuator as a function of said control signal, and wherein said control signal is proportional to the difference between the haulback velocity as indicated by said velocity signal and a predetermined haulback velocity.

8. The ejection seat haulback system of claim 7 wherein said predetermined haulback velocity varies as a function of time from the initiation of an ejection sequence.

9. The ejection seat haulback system of claim 8 wherein said predetermined haulback velocity increases at a faster rate and achieves a higher maximum velocity for increasing haulback distances.

10. The ejection seat haulback system of claim 1, further including means for sensing when haulback has been completed and for generating a haulback terminate signal indicative thereof, and wherein said valve controller means causes said servovalve to terminate the flow of fluid to said pneumatic actuator responsive to receipt of said haulback terminate signal.

11. The ejection seat haulback system of claim 8, further including means for measuring the flight acceleration of said aircraft and for generating a g-load signal indicative thereof, and wherein the response time of said valve controller varies as a function of said g-load signal so that said haulback system responds at a higher force at higher g-loads.

12. The ejection seat haulback system of claim 1, further including means for measuring the flight acceleration of said aircraft and for generating a g-load signal indicative thereof, and wherein said ejection scat haulback system further includes locking means for preventing said haulback straps from unwinding on said haulback reel in response to a g-load signal indicative of an aircraft acceleration exceeding a predetermined value.

13. The ejection seat haulback system of claim 12 wherein said means for measuring the flight acceleration of said aircraft measures acceleration along thrust and lift axes of said aircraft and generates said g-load signal in response thereto.

14. The ejection seat haulback system of claim 12 wherein said locking means includes a ratchet rotating with said haulback reel, a solenoid, and a locking plunger operated by said solenoid to engage said ratchet and prevent rotation of said haulback reel.

15. The ejection seat haulback system of claim 14 wherein said locking plunger is resiliently biased toward said ratchet so that, in the event that power is removed from said solenoid, said haulback reel is locked to prevent rotation.

16. A method of positioning a pilot in an ejection seat prior to ejection from an aircraft, said ejection seat including a rotatably mounted haulback reel having at least one haulback strap wound thereon and adapted to be connected to said pilot, said method comprising:

rotating said haulback reel to wind said haulback strap on said reel in the event of an emergency ejection from said aircraft, thereby drawing said pilot toward said seat;

measuring the velocity of said haulback as said haulback strap is wound onto said reel; and comparing the measured velocity of said haulback with a desired haulback velocity and adjusting the rotational velocity of said haulback reel as a result of said comparison so that said desired haulback velocity is achieved.

17. The method of claim 16 wherein said desired haulback velocity varies as a function of time from the initiation of said haulback.

18. The method of claim 17 wherein said desired haulback velocity increases at a faster rate and achieves a higher maximum value for increasing haulback distances.

* * * * *

UNITED STATES PATENT AND TRADEMARK OFFICE
CERTIFICATE OF CORRECTION

PATENT NO.   : 4,871,131
DATED        : October 3, 1989
INVENTOR(S)  : Coral A. Bernier; Douglas E. Swanson It is certified that error appears in the above-identified patent and that said Letters Patent is hereby corrected as shown below:

In claim 3, column 8, line 5, delete "clam" and substitute therefor --claim--.

In claim 12, column 8, line 54, delete "scat" and substitute therefor --seat--.

Signed and Sealed this

Eighteenth Day of September, 1990

Attest:

HARRY F. MANBECK, JR.

*Attesting Officer*         *Commissioner of Patents and Trademarks*